US010472505B2

(12) United States Patent
Yamashiro

(10) Patent No.: US 10,472,505 B2
(45) Date of Patent: Nov. 12, 2019

(54) PNEUMATIC TIRE

(71) Applicant: SUMITOMO RUBBER INDUSTRIES, LTD., Kobe-shi, Hyogo (JP)

(72) Inventor: Yuhei Yamashiro, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/791,767

(22) Filed: Oct. 24, 2017

(65) Prior Publication Data

US 2018/0142089 A1 May 24, 2018

(30) Foreign Application Priority Data

Nov. 22, 2016 (JP) ................ 2016-226923

(51) Int. Cl.
*C08L 9/06* (2006.01)
*B60C 1/00* (2006.01)
*C08L 15/00* (2006.01)

(52) U.S. Cl.
CPC ........ *C08L 9/06* (2013.01); *B60C 1/00* (2013.01); *B60C 1/0016* (2013.01); *B60C 1/0025* (2013.01); *C08L 15/00* (2013.01); *C08L 2205/025* (2013.01); *C08L 2205/03* (2013.01)

(58) Field of Classification Search
CPC ................ C08L 9/06; C08K 3/36; B60C 1/00
USPC ........................................................ 524/526
See application file for complete search history.

(56) References Cited

U.S. PATENT DOCUMENTS

| | | | |
|---|---|---|---|
| 4,124,051 A | 11/1978 | Horton | |
| 4,945,964 A | 8/1990 | Takiguchi et al. | |
| 5,191,003 A | 3/1993 | Inui et al. | |
| 5,385,459 A | 1/1995 | Graves et al. | |
| 5,627,237 A | 5/1997 | Halasa et al. | |
| 5,711,904 A | 1/1998 | Eswaran et al. | |
| 5,804,644 A | 9/1998 | Nakafutami et al. | |
| 9,127,145 B2 | 9/2015 | Tanabe | |
| 10,189,974 B2 | 1/2019 | Tanenaka et al. | |
| 2001/0016629 A1 | 8/2001 | Mori et al. | |
| 2004/0242797 A1 | 12/2004 | Stere et al. | |
| 2004/0254301 A1 | 12/2004 | Tsukimawashi et al. | |
| 2005/0119414 A1 | 6/2005 | Sasagawa et al. | |
| 2005/0119452 A1 | 6/2005 | Yamaguchi et al. | |
| 2005/0234193 A1 | 10/2005 | Sasagawa et al. | |
| 2005/0277750 A1 | 12/2005 | Masaki et al. | |
| 2006/0167160 A1 | 7/2006 | Nakagawa et al. | |
| 2007/0078202 A1 | 4/2007 | Mihara et al. | |
| 2007/0276090 A1 | 11/2007 | Aoki et al. | |
| 2011/0136962 A1 | 6/2011 | Hattori et al. | |
| 2011/0144236 A1 | 6/2011 | Mihara | |
| 2011/0166254 A1 | 7/2011 | Nishimura | |
| 2011/0184084 A1 | 7/2011 | Katou | |
| 2012/0016056 A1 | 1/2012 | Miyazaki | |
| 2012/0148917 A1 | 6/2012 | Kobayashi et al. | |
| 2012/0283354 A1 | 11/2012 | Hattori et al. | |
| 2012/0325391 A1 | 12/2012 | Miyazaki | |
| 2013/0079464 A1 | 3/2013 | Nishioka et al. | |
| 2014/0090764 A1 | 4/2014 | Miyazaki | |
| 2014/0329930 A1 | 11/2014 | Sato | |
| 2014/0371372 A1 | 12/2014 | Hirayama | |
| 2015/0031839 A1 | 1/2015 | Washizu | |
| 2015/0361210 A1 | 12/2015 | Nosaka et al. | |
| 2015/0368387 A1 | 12/2015 | Nosaka et al. | |
| 2016/0339743 A1 | 11/2016 | Abad et al. | |
| 2017/0066910 A1 | 3/2017 | Miura | |
| 2017/0226233 A1 | 8/2017 | Yamashiro et al. | |
| 2017/0226331 A1* | 8/2017 | Ishino | ............... B60C 1/00 |

(Continued)

FOREIGN PATENT DOCUMENTS

| | | |
|---|---|---|
| CN | 1156467 A | 8/1997 |
| CN | 1541245 A | 10/2004 |

(Continued)

OTHER PUBLICATIONS

ASTM, "Standard Test Method for Carbon Black—CTAB (Cetyltrimethylammonium Bromide) Surface Area (Withdrawn 2007)," ASTM D3765-04, 2004, XP-002778471, 3 pages.
ASTM, "Standard Test Methods for Carbon Black—Surface Area by Multipoint B.E.T. Nitrogen Adsorption (Withdrawn 2000)," ASTM D4820-99, 1999, XP-002778482, 2 pages.
ASTM, "Standard Test Methods for Carbon Black—Surface Area by Nitrogen Adsorption (Withdrawn 1999)," ASTM D3037-93, 1993, XP-002778481, 2 pages.
Chinese Office Action and Search Report for Chinese Application No. 201580045221.3, dated Mar. 30, 2018, with an English translation of the Office Action.
Sanshin Chemical Industry, "Sanceler TBZTD," retrieved from URL:http:www.sanshin-ci.co.jp/eng/index/syouhin/1/sanceler_tbztd.htm, retrieved Dec. 17, 2018, 1 page.

(Continued)

*Primary Examiner* — Deve V Hall
(74) *Attorney, Agent, or Firm* — Birch, Stewart, Kolasch & Birch LLP

(57) ABSTRACT

The present invention provides a pneumatic tire that achieves a balanced improvement in fuel economy, abrasion resistance, and processability. A pneumatic tire formed from a rubber composition, the rubber composition containing a rubber component including a hydrogenated copolymer and a general purpose rubber, the hydrogenated copolymer containing a structural unit derived from an aromatic vinyl compound and a structural unit derived from a conjugated diene compound, the hydrogenated copolymer having a degree of hydrogenation of the conjugated diene portion of 30 to 100 mol %, a weight average molecular weight of 50,000 to 2,000,000, and a styrene content of 5% to 50% by mass, the general purpose rubber being at least one selected from the group consisting of natural rubber, polyisoprene rubber, styrene-butadiene rubber, and polybutadiene rubber, the rubber component including, based on 100% by mass thereof, 10% to 80% by mass of the hydrogenated copolymer.

12 Claims, No Drawings

(56) References Cited

U.S. PATENT DOCUMENTS

| | | |
|---|---|---|
| 2017/0233562 A1 | 8/2017 | Yamada et al. |
| 2017/0240731 A1 | 8/2017 | Yamashiro et al. |
| 2018/0142089 A1 | 5/2018 | Yamashiro |

FOREIGN PATENT DOCUMENTS

| | | |
|---|---|---|
| CN | 1576279 A | 2/2005 |
| CN | 101412515 A | 4/2009 |
| CN | 101990558 A | 3/2011 |
| CN | 102093602 A | 6/2011 |
| CN | 106519351 A | 3/2017 |
| EP | 0775725 A1 | 5/1997 |
| EP | 1258498 A1 | 11/2002 |
| EP | 2236554 A1 | 10/2010 |
| EP | 2757131 A1 | 7/2014 |
| EP | 2960286 A1 | 12/2015 |
| EP | 2963087 A1 | 1/2016 |
| EP | 3064545 A1 | 9/2016 |
| EP | 3162846 A1 | 5/2017 |
| EP | 3208108 A1 | 8/2017 |
| JP | 2-147647 A | 6/1990 |
| JP | 6-9822 A | 1/1994 |
| JP | 7-76635 A | 3/1995 |
| JP | 8-59898 A | 3/1996 |
| JP | 10-182884 A | 7/1998 |
| JP | 2000-119445 A | 4/2000 |
| JP | 2000-344955 A | 12/2000 |
| JP | 2001-81243 A | 3/2001 |
| JP | 2002-12704 A | 1/2002 |
| JP | 2002-212340 A | 7/2002 |
| JP | 2003-41059 A | 2/2003 |
| JP | 2003-277560 A | 10/2003 |
| JP | 2006-213807 A | 8/2006 |
| JP | 2006-249188 A | 9/2006 |
| JP | 2007-137941 A | 6/2007 |
| JP | 4060105 B2 | 3/2008 |
| JP | 2008-174696 A | 7/2008 |
| JP | 2008-184517 A | 8/2008 |
| JP | 2008-248203 A | 10/2008 |
| JP | 2010-242019 A | 10/2010 |
| JP | 2010-265379 A | 11/2010 |
| JP | 2011-1435 A | 1/2011 |
| JP | 2011-140613 A | 7/2011 |
| JP | 2011-144239 A | 7/2011 |
| JP | 2011-153293 A | 8/2011 |
| JP | 2011-236368 A | 11/2011 |
| JP | 2011-252116 A | 12/2011 |
| JP | 2012-52028 A | 3/2012 |
| JP | 2012-153810 A | 8/2012 |
| JP | 2012-188537 A | 10/2012 |
| JP | 2013-18868 A | 1/2013 |
| JP | 2013-28783 A | 2/2013 |
| JP | 2013-35902 A | 2/2013 |
| JP | 2013-82778 A | 5/2013 |
| JP | 2013-224391 A | 10/2013 |
| JP | 2013-253207 A | 12/2013 |
| JP | 2014-24913 A | 2/2014 |
| JP | 2014-80451 A | 5/2014 |
| JP | 2014-95018 A | 5/2014 |
| JP | 2014-95081 A | 5/2014 |
| JP | 2014-105296 A | 6/2014 |
| JP | 2014-125546 A | 7/2014 |
| JP | 2014-133827 A | 7/2014 |
| JP | 2014-133828 A | 7/2014 |
| JP | 2015-54875 A | 3/2015 |
| JP | 2015-110703 A | 6/2015 |
| JP | 2017-52874 A | 3/2017 |
| WO | WO 2009/060931 A1 | 5/2009 |
| WO | WO 2013/099324 A1 | 7/2013 |
| WO | WO 2013/125614 A1 | 8/2013 |
| WO | WO 2014/126184 A1 | 8/2014 |
| WO | WO 2014/133097 A1 | 9/2014 |
| WO | WO 2015/064646 A1 | 5/2015 |
| WO | WO2016/039008 * | 3/2016 |

OTHER PUBLICATIONS

"Polymer Chemistry and Physics," Light Industry Press, Feb. 28, 1981, p. 351 (2 pages total).
English translation of the Chinese Office Action for Application No. 201580044936.7, dated Nov. 16, 2018.
Yanming et al., "Polymer Structure and Properties," East China University of Science and Technology Press, Jan. 31, 2010, p. 278-279 (3 pages total).
Author Unknown, "Carbon Black Production and Application Manual," Sep. 30, 2000, 8 pages total.
Database WPI Week 200661, "Rubber composition for pneumatic tire, is formed by mixing specific hydrogenated styrene-butadiene copolymer and aromatic . . . ," Thomson Scientific, London, GB, AN 2006-589923, Aug. 17, 2006, 2 pages, XP002770767.
English translation of Chinese Office Action for Appl. No. 201580044378.4 dated Aug. 16, 2018.
English translation of the Chinese Office Action for Application No. 201580044936.7, dated Mar. 30, 2018.
International Search Report (Form PCT/ISA/210) for International Application No. PCT/JP2015/069823, dated Oct. 13, 2015.
International Search Report for PCT/JP2015/069836 (PCT/ISA/210) dated Oct. 13, 2015.
Written Opinion of the International Searching Authority for PCT/JP2015/069836 (PCT/ISA/237) dated Oct. 13, 2015.
Written Opinion of the International Searching Authority (Form PCT/ISA/237) for International Application No. PCT/JP2015/069823, dated Oct. 13, 2015.
Zhao, S.G., et al, "Effect of Coupling Agent on Properties of Silica Z1115MP Filled SSBR/BR Compound," Journal of Qingdao University of Science and Technology (Natural Science Edition), Aug. 31, 2013, vol. 34, No. 4, pp. 387-392.

* cited by examiner

PNEUMATIC TIRE

TECHNICAL FIELD

The present invention relates to a pneumatic tire formed from a specific rubber composition.

BACKGROUND ART

With the recent increase in concern about environmental issues, the demand for fuel efficient automobiles has been increasing. There is also a need for rubber compositions for automotive tires having excellent fuel economy. For example, rubber compositions containing conjugated diene polymers such as polybutadiene or butadiene-styrene copolymers and fillers such as carbon black or silica are used in automotive tires.

Patent Literature 1, for example, proposes a technique for improving fuel economy by using a diene rubber (modified rubber) that has been modified with an organosilicon compound containing an amino group and an alkoxy group. Although such conventional techniques improve fuel economy, it is also important to ensure sufficient abrasion resistance from economic and safety standpoints. The conventional techniques have a problem in that the abrasion resistance, which has a trade-off relationship with fuel economy, is insufficient to solve the above challenge. Thus, it is difficult to simultaneously improve fuel economy and abrasion resistance.

Moreover, Patent Literature 2 proposes a technique for improving abrasion resistance and other properties by using a hydrogenated diene polymer.

CITATION LIST

Patent Literature

Patent Literature 1: JP 2000-344955 A
Patent Literature 2: JP H2-147647 A

SUMMARY OF INVENTION

Technical Problem

The method of Patent Literature 2 improves abrasion resistance while ensuring good fuel economy.

The hydrogenated diene polymers (hereinafter, also referred to as hydrogenated copolymers) as described for the method of Patent Literature 2 have a slower cure rate than general purpose rubbers used in tire materials, e.g. natural rubber (NR), polyisoprene rubber (IR), styrene-butadiene rubber (SBR), polybutadiene rubber (BR). For this reason it is thought that if the hydrogenated copolymers are used in combination with general purpose rubbers, they cannot exert their effect of improving abrasion resistance. Therefore, for use as a rubber component, the hydrogenated copolymers are usually used alone. However, compounds whose rubber component consists only of hydrogenated copolymers tend to have poor adhesion to adjacent components due to the cure rate. In addition, rubber compositions containing hydrogenated copolymers with higher degrees of hydrogenation have higher Mooney viscosities and thus tend to have inferior processability.

As described above, with the conventional techniques, it is difficult to obtain rubber compositions for tires excellent in processability (adhesion to adjacent components and proper Mooney viscosity) as well as in fuel economy and abrasion resistance.

The present invention aims to solve the above problems and provide a pneumatic tire that achieves a balanced improvement in fuel economy, abrasion resistance, and processability.

Solution to Problem

The inventor of the present invention investigated the above problems and has found that when a hydrogenated copolymer is used in combination with at least one selected from the group consisting of NR, IR, SBR, and BR, which are general purpose rubbers, relatively good fuel economy and abrasion resistance can be ensured, and good adhesion to adjacent components and good Mooney viscosity can also be obtained. Accordingly, the inventor successfully solved the problems and completed the present invention.

Specifically, the present invention relates to a pneumatic tire, formed from a rubber composition, the rubber composition containing a rubber component including a hydrogenated copolymer and a general purpose rubber, the hydrogenated copolymer containing a structural unit derived from an aromatic vinyl compound and a structural unit derived from a conjugated diene compound, the hydrogenated copolymer having a degree of hydrogenation of the conjugated diene portion of 30 to 100 mol %, a weight average molecular weight of 50,000 to 2,000,000, and a styrene content of 5% to 50% by mass, the general purpose rubber being at least one selected from the group consisting of natural rubber, polyisoprene rubber, styrene-butadiene rubber, and polybutadiene rubber, the rubber component including, based on 100% by mass thereof, 10% to 80% by mass of the hydrogenated copolymer.

The hydrogenated copolymer preferably has a degree of hydrogenation of 60 to 100 mol %.

The hydrogenated copolymer preferably has a degree of hydrogenation of 90 to 100 mol %.

The hydrogenated copolymer is preferably a hydrogenated styrene-butadiene copolymer.

The hydrogenated copolymer is preferably a hydrogenated modified styrene-butadiene copolymer.

The hydrogenated copolymer preferably has a weight average molecular weight of 200,000 to 2,000,000.

The rubber component preferably includes, based on 100% by mass thereof, 10% to 60% by mass of the hydrogenated copolymer.

The rubber component preferably includes, based on 100% by mass thereof, 10% to 40% by mass of the hydrogenated copolymer.

The hydrogenated copolymer preferably has a styrene content of 20% to 50% by mass.

The rubber composition preferably contains silica in an amount of 1 to 200 parts by mass per 100 parts by mass of the rubber component.

The rubber composition preferably contains carbon black in an amount of 1 part by mass or more per 100 parts by mass of the rubber component.

The pneumatic tire preferably includes a tread formed from the rubber composition.

The pneumatic tire preferably includes a sidewall formed from the rubber composition.

Advantageous Effects of Invention

The pneumatic tire of the present invention is formed from a rubber composition which contains a specific hydrogenated copolymer and a specific general purpose rubber to provide good fuel economy, abrasion resistance, adhesion to adjacent components, and Mooney viscosity. It is thus possible to provide a pneumatic tire that achieves a balanced improvement in fuel economy, abrasion resistance, and processability.

DESCRIPTION OF EMBODIMENTS

The pneumatic tire of the present invention is formed from a rubber composition that contains a hydrogenated copolymer and a general purpose rubber. The hydrogenated copolymer is obtained by copolymerizing an aromatic vinyl compound and a conjugated diene compound to produce a copolymer containing a structural unit derived from the aromatic vinyl compound and a structural unit derived from the conjugated diene compound (hereinafter, also referred to as a copolymer of an aromatic vinyl compound and a conjugated diene compound), and hydrogenating the conjugated diene portion (the structural unit derived from the conjugated diene compound) of the copolymer. The hydrogenated copolymer has a degree of hydrogenation, a weight average molecular weight, and a styrene content falling within respective predetermined ranges. The general purpose rubber is at least one selected from the group consisting of NR, IR, SBR, and BR.

The rubber component of the rubber composition in the present invention includes a hydrogenated copolymer to improve abrasion resistance while maintaining or improving good fuel economy.

The rubber component of the rubber composition in the present invention further includes at least one general purpose rubber selected from the group consisting of NR, IR, SBR, and BR. This improves adhesion to adjacent components and Mooney viscosity while maintaining good levels of fuel economy and abrasion resistance.

Due to the foregoing effects, it is possible to provide a pneumatic tire that achieves a balanced improvement in fuel economy, abrasion resistance, and processability.

General purpose rubbers contain a large number of double bonds where a crosslinking reaction can take place, and therefore will have variations in crosslink concentration which are considered to cause stress concentration that can initiate fracture. In the hydrogenated copolymer used in the present invention, the number of double bonds is reduced by a hydrogenation treatment to reduce the reactive sites for crosslinking. Thus, the variations in crosslink concentration are expected to decrease so that the stress concentration is reduced, thereby resulting in improvements in abrasion resistance and other properties.

Examples of the aromatic vinyl compound include styrene, α-methylstyrene, 1-vinylnaphthalene, 3-vinyltoluene, ethylvinylbenzene, divinylbenzene, 4-cyclohexylstyrene, and 2,4,6-trimethylstyrene. These compounds may be used alone, or two or more of these may be used in combination. Among these examples, styrene is particularly preferred in view of practical aspects such as monomer availability and because the effects of the present invention can be more suitably achieved.

Examples of the conjugated diene compound include 1,3-butadiene, isoprene, 1,3-pentadiene, 2,3-dimethylbutadiene, 2-phenyl-1,3-butadiene, and 1,3-hexadiene. These compounds may be used alone, or two or more of these may be used in combination. Among these examples, 1,3-butadiene or isoprene is preferred, with 1,3-butadiene being more preferred, in view of practical aspects such as monomer availability and because the effects of the present invention can be more suitably achieved.

The copolymer of an aromatic vinyl compound and a conjugated diene compound is preferably a copolymer of styrene and 1,3-butadiene (styrene-butadiene copolymer (SBR)). The hydrogenated copolymer is thus preferably a hydrogenated styrene-butadiene copolymer (hydrogenated SBR). Furthermore, the hydrogenated styrene-butadiene copolymer is preferably a hydrogenated modified styrene-butadiene copolymer (hydrogenated modified SBR) that has been modified as described later.

The styrene-butadiene copolymer may be produced by copolymerizing styrene and 1,3-butadiene in any order, and may also be produced by random copolymerization or block copolymerization, preferably by random copolymerization. The same applies to copolymers of aromatic vinyl compounds and conjugated diene compounds other than styrene-butadiene copolymers.

The degree of hydrogenation of the hydrogenated copolymer (the degree of hydrogenation of the conjugated diene portion of the copolymer of an aromatic vinyl compound and a conjugated diene compound) is 30 mol % or more. In view of abrasion resistance, the degree of hydrogenation is preferably 60 mol % or more, more preferably 90 mol % or more. The upper limit of the degree of hydrogenation is not particularly limited and may be 100 mol %.

The degree of hydrogenation can be calculated from the rate of decrease in the intensity of a $^1$H-NMR spectrum corresponding to unsaturated bonds.

The hydrogenated copolymer has a weight average molecular weight (Mw) of 50,000 or more. In view of abrasion resistance, the Mw is preferably 200,000 or more, more preferably 400,000 or more. Also, the Mw of the hydrogenated copolymer is 2,000,000 or less. In view of Mooney viscosity, the Mw is preferably 1,000,000 or less, more preferably 700,000 or less.

Herein, the weight average molecular weight (Mw) and the number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

In view of abrasion resistance, the hydrogenated copolymer preferably has a glass transition temperature (Tg) of −70° C. or higher, more preferably −40° C. or higher, still more preferably −35° C. or higher. For the same reason, the Tg of the hydrogenated copolymer is also preferably lower than −10° C., more preferably lower than −15° C., still more preferably lower than −20° C.

The glass transition temperature (Tg) of the hydrogenated copolymer is measured as described later in EXAMPLES.

The hydrogenated copolymer has a styrene content of 5% by mass or more. In order to suitably achieve the effects of the present invention, the styrene content is preferably 20% by mass or more, more preferably 25% by mass or more. Also, the styrene content of the hydrogenated copolymer is 50% by mass or less. For the same reason, the styrene content is preferably 40% by mass or less, more preferably 35% by mass or less.

The styrene content is measured as described later in EXAMPLES.

The hydrogenated copolymer may be synthesized, for example, by polymerizing an aromatic vinyl compound and a conjugated diene compound to produce a copolymer, and hydrogenating the copolymer, specifically as follows.

<Method for Producing Copolymer>
(Polymerization Method)

The copolymer of an aromatic vinyl compound and a conjugated diene compound may be produced by any polymerization method, including solution polymerization, vapor phase polymerization, and bulk polymerization, and particularly preferably by solution polymerization. The polymerization may be carried out either in a batch mode or in a continuous mode.

For solution polymerization, the monomer concentration (the combined concentration of styrene and 1,3-butadiene in the case of a styrene-butadiene copolymer) in the solvent is preferably 5% by mass or more, more preferably 10% by mass or more. When the monomer concentration in the solvent is less than 5% by mass, the copolymer yield tends to be small, resulting in increased cost. The monomer concentration in the solvent is also preferably 50% by mass or less, more preferably 30% by mass or less. When the monomer concentration in the solvent is more than 50% by mass, the solution tends to become too viscous to stir easily, and thus polymerization tends not to occur easily.

(Polymerization Initiator for Anionic Polymerization)

For anionic polymerization, any type of polymerization initiator may be used. Preferred are organic lithium compounds which preferably contain a C2-C20 alkyl group, such as ethyllithium, n-propyllithium, isopropyllithium, n-butyllithium, sec-butyllithium, tert-butyllithium, tert-octyllithium, n-decyllithium, phenyllithium, 2-naphthyllithium, 2-butylphenyllithium, 4-phenylbutyllithium, cyclohexyllithium, cyclopentyllithium, and reaction products of diisopropenylbenzene and butyllithium. In view of availability, safety and other aspects, preferred among these is n-butyllithium or sec-butyllithium.

The polymerization reaction may be carried out in the presence of a compound (R) obtained by mixing at least one of the organic lithium compounds mentioned above with a compound (B1) containing a functional group interactive with silica. In the polymerization in the presence of the compound (R), the functional group interactive with silica is introduced into the polymerization initiating terminal of the copolymer. Thus, the resulting copolymer has a modified polymerization initiating terminal. The term "interactive" herein means the formation of a covalent bond or an intermolecular force weaker than covalent bonds (e.g. electromagnetic forces between molecules such as ion-dipole interaction, dipole-dipole interaction, hydrogen bond, or van der Waals force) between molecules. The term "functional group interactive with silica" refers to a group having at least one atom interactive with silica such as a nitrogen atom, a sulfur atom, a phosphorus atom, or an oxygen atom.

The compound (R) is preferably a reaction product of an organic lithium compound and a nitrogen-containing compound such as a secondary amine compound. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, and 1,3-ditrimethylsilyl-1,3,5-triazinane. The polymerization in the presence of the compound (R) may be carried out by preliminarily mixing an organic lithium compound with a compound (B1) to prepare a compound (R), and adding the compound (R) to the polymerization system, followed by polymerization. Alternatively, it may be carried out by adding an organic lithium compound and a compound (B1) to the polymerization system and mixing them in the polymerization system to prepare a compound (R), followed by polymerization.

(Method for Anionic Polymerization)

The production of the copolymer through anionic polymerization using the polymerization initiator may be carried out by any method including conventionally known methods.

Specifically, monomers, for example, styrene and 1,3-butadiene may be anionically polymerized in an organic solvent inert to the reaction, for example, a hydrocarbon solvent such as an aliphatic, alicyclic, or aromatic hydrocarbon compound, using a polymerization initiator such as butyllithium, optionally in the presence of a randomizer to produce a target copolymer, e.g. a styrene-butadiene copolymer.

(Hydrocarbon Solvent for Anionic Polymerization)

The hydrocarbon solvent is preferably a C3-C8 hydrocarbon solvent, and examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. These solvents may be used alone, or two or more of these may be used in admixture.

(Randomizer for Anionic Polymerization)

The randomizer refers to a compound that has the function of controlling the microstructure of the conjugated diene portion of a copolymer, for example, increase of 1,2-butadiene units or 3,4-isoprene units, or the function of controlling the compositional distribution of monomer units in a copolymer, for example, randomization of styrene units and butadiene units in a styrene-butadiene copolymer. The randomizer is not particularly limited, and any known compound commonly and conventionally used as a randomizer may be used. Examples include ethers and tertiary amines, such as dimethoxybenzene, tetrahydrofuran, dimethoxyethane, diethylene glycol dibutyl ether, diethylene glycol dimethyl ether, bis(tetrahydrofuryl)propane, triethylamine, pyridine, N-methylmorpholine, N,N,N',N'-tetramethylethylenediamine, and 1,2-dipiperidinoethane. Other examples include potassium salts such as potassium-t-amylate and potassium-t-butoxide; and sodium salts such as sodium-t-amylate. These randomizers may be used alone, or two or more of these may be used in combination. The amount of the randomizer used per mol of the organic lithium compound is preferably 0.01 mole equivalents or more, more preferably 0.05 mole equivalents or more. When the amount of the randomizer is less than 0.01 mole equivalents, the added randomizer tends to produce a little effect, and thus randomization tends not to occur easily. The amount of the randomizer per mol of the organic lithium compound is also preferably 1,000 mole equivalents or less, more preferably 500 mole equivalents or less. When the amount of the randomizer is more than 1,000 mole equivalents, the reaction rate of monomers tends to change greatly, and randomization tends to be adversely affected.

The Tg of the copolymer can be controlled by varying the type or amount of the randomizer. For example, the Tg of the copolymer may be reduced by decreasing the amount of tetrahydrofuran.

(Reaction Temperature)

The anionic polymerization may be carried out at any reaction temperature as long as the reaction suitably proceeds. Usually, the reaction temperature is preferably −10° C. to 100° C., more preferably 25° C. to 70° C.

(Modification Step)

The active terminal of the copolymer obtained by the above polymerization step may be reacted with a compound (B2) containing a functional group interactive with silica to introduce the functional group interactive with silica into the polymerization terminating terminal of the copolymer. This step allows the copolymer to have a modified polymerization terminating terminal. The term "terminal" herein refers to the end portion of the molecular chain, excluding monomer-derived structures containing carbon-carbon double bonds.

The copolymer used in the modification reaction (hereinafter, also referred to as terminal modification reaction) may be any copolymer that has an active terminal with an unmodified or modified polymerization initiating terminal. The compound (B2) may be any compound that contains a functional group interactive with silica and is reactable with the polymerization active terminal. Preferable specific examples of the compound (B2) include:

(I) a compound (B2-1) represented by the following formula (1):

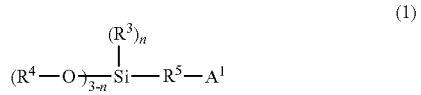

wherein $A^1$ represents a monovalent functional group which contains no active hydrogen but contains at least one selected from the group consisting of a nitrogen atom, a phosphorus atom, and a sulfur atom, and is bound to $R^5$ through the nitrogen, phosphorus, or sulfur atom; $R^3$ and $R^4$ each represent a hydrocarbyl group; $R^5$ represents a hydrocarbylene group; and n represents an integer of 0 to 2, provided that when two or more $R^3$ or $R^4$ groups are present, they may be the same or different;

(II) a compound (B2-2) which has, in the molecule, one or more functional groups (x1) of at least one type selected from the group consisting of a cyclic ether group, a (thio) carbonyl group, and an iso(thio)cyanate group, and one or more groups (x2) different from the functional groups (x1) that contain no active hydrogen but contain at least one selected from the group consisting of a nitrogen atom, a phosphorus atom, an oxygen atom, and a sulfur atom, provided that at least one of the nitrogen, phosphorus, and sulfur atoms may be protected by a trisubstituted hydrocarbylsilyl group; and (III) a compound (B2-3) having two or more iso(thio) cyanate groups in the molecule. These compounds (B2) may be used alone, or two or more of these may be used in combination. Herein, the term "(thio)carbonyl group" refers to a carbonyl group and a thiocarbonyl group; and the term "iso(thio)cyanate group" refers to an isocyanate group and an isothiocyanate group.

The hydrocarbyl group for $R^3$ and $R^4$ in formula (1) is preferably a linear or branched C1-C20 alkyl group, a C3-C20 cycloalkyl group, or a C6-C20 aryl group.

$R^5$ is preferably a linear or branched C1-C20 alkanediyl group, a C3-C20 cycloalkylene group, or a C6-C20 arylene group.

Preferably, n is 0 or 1 in order to increase the reactivity with the copolymer.

$A^1$ contains at least one selected from the group consisting of a nitrogen atom, a phosphorus atom, and a sulfur atom (hereinafter, also referred to as a specific atom), and is bound to $R^5$ through the specific atom. The specific atom is bound to no active hydrogen, and may be protected by, for example, a trisubstituted hydrocarbylsilyl group. The term "active hydrogen" herein refers to a hydrogen atom bound to an atom other than a carbon atom, and preferably refers to a hydrogen atom having a bond energy lower than the carbon-hydrogen bond of polymethylene.

Preferably, $A^1$ is a group that can be converted to an onium ion by the action of an onium salt-forming agent. The compound (B2) containing such a group ($A^1$) can impart excellent shape-retaining properties to the copolymer to be modified.

Specific examples of $A^1$ include a nitrogen-containing group in which two hydrogen atoms of a primary amino group are substituted by two protecting groups; a nitrogen-containing group in which one hydrogen atom of a secondary amino group is substituted by one protecting group; a tertiary amino group; an imino group; a pyridyl group; a phosphorus-containing group in which two hydrogen atoms of a primary phosphino group are substituted by two protecting groups; a phosphorus-containing group in which one hydrogen atom of a secondary phosphino group is substituted by one protecting group; a tertiary phosphino group; and a sulfur-containing group in which one hydrogen atom of a thiol group is substituted by one protecting group. Among these, groups containing a nitrogen atom are preferred because of their good affinity for silica. The term "protecting group" refers to a functional group that converts $A^1$ to a functional group inert to the polymerization active terminal, such as, for example, a trisubstituted hydrocarbylsilyl group.

Specific examples of the compound (B2-1) are described below. Examples of compounds containing both an alkoxysilyl group and a nitrogen-containing group in which two hydrogen atoms of a primary amine are substituted by two protecting groups, a nitrogen-containing group in which one hydrogen atom of a secondary amine is substituted by one protecting group, or a tertiary amino group include N,N-bis(trimethylsilyl)aminopropyltrimethoxysilane, N,N-bis(trimethylsilyl)aminopropylmethyldiethoxysilane, N,N',N'-tris(trimethylsilyl)-N-(2-aminoethyl)-3-aminopropyltriethoxysilane, and 3-(4-trimethylsilyl-1-piperazino)propylmethyldimethoxysilane.

Examples of compounds containing both an alkoxysilyl group and an imino group or a pyridyl group include N-(1,3-dimethylbutylidene)-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, and trimethoxysilyl, methyldiethoxysilyl, or ethyldimethoxysilyl compounds corresponding to the foregoing triethoxysilyl compounds, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropylmethyldimethoxysilane, and the foregoing compounds whose alkyl group and alkanediyl group are replaced with a C1-C6 alkyl group and a C1-C6 alkanediyl group, respectively.

Examples of compounds containing both an alkoxysilyl group and a phosphorus-containing group in which two hydrogen atoms of a primary phosphino group are substituted by two protecting groups, a phosphorus-containing group in which one hydrogen atom of a secondary phosphino group is substituted by one protecting group, a tertiary phosphino group, or a sulfur-containing group in which one hydrogen atom of a thiol group is substituted by one protecting group include P,P-bis(trimethylsilyl)phosphinopropylmethyldimethoxysilane, P,P-bis(trimethylsilyl)phosphinopropyltrimethoxysilane, 3-dimethylphosphinopropyltrimethoxysilane, 3-dimethylphosphinopropylmethyldimethoxysilane, 3-diphenylphosphinopropyltrimethoxysilane, 3-diphenylphosphinopropyltriethoxysilane, 3-diphenylphosphinopropylmethyldimethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, and the foregoing compounds whose alkyl group and alkanediyl group are replaced with a C1-C6 alkyl group and a C1-C6 alkanediyl group, respectively. In addition, examples of compounds containing an iso(thio)cyanate group include 3-isocyanatopropyltrimethoxysilane and 3-isocyanatopropyltriethoxysilane.

In the compound (B2-2), the group (x2) is preferably a group that contains a nitrogen atom bound to no active hydrogen. Specific examples of such compounds include:

compounds containing a cyclic ether group, such as epoxy amine compounds, e.g. tetraglycidyl-1,3-bisaminomethylcyclohexane, compounds containing a (thio)carbonyl group, such as 4-aminoacetophenones, e.g. 4-N,N-dimethylaminobenzophenone; bis(dihydrocarbylaminoalkyl)ketones, e.g. 1,7-bis(methylethylamino)-4-heptanone; dihydrocarbylaminoalkyl (meth)acrylates, e.g. 2-dimethylaminoethyl acrylate; hydrocarbylimidazolidinones, e.g. 1,3-dimethyl-2-imidazolidinone; N-hydrocarbylpyrrolidones, e.g. 1-phenyl-2-pyrrolidone; N-hydrocarbylcaprolactams, e.g. N-methyl-ε-caprolactam; N-dihydrocarbylformamides, e.g. N,N-diethylformamide; N,N-dihydrocarbylacetamides, e.g. N,N-dimethylacetamide; and (meth)acrylamides, e.g. N,N-dimethylacrylamide, and compounds containing an iso(thio)cyanate group, such as 3-isocyanatopropyltrimethoxysilane.

Examples of the compound (B2-3) include 2,4-tolylene diisocyanate, 2,6-tolylene diisocyanate, diphenylmethane diisocyanate, naphthalene diisocyanate, triphenylmethane triisocyanate, p-phenylene diisocyanate, tris(isocyanatophenyl)thiophosphate, xylene diisocyanate, benzene-1,2,4-triisocyanate, naphthalene-1,2,5,7-tetraisocyanate, and 1,4-phenylene diisothiocyanate.

The compound (B2) is particularly preferably a compound (B2-1) because of its high affinity for silica. When a silane compound (B2-1) is used, for example, silicon tetrachloride or an epoxy-containing compound (e.g. tetraglycidyl-1,3-bisaminomethylcyclohexane) may be used with the silane compound (B2-1) to control the Mooney viscosity of the modified copolymer. The compounds (B2) mentioned above all have the same function in that they allow the resulting modified copolymer to have a modified polymerization terminating terminal. Accordingly, those which are not disclosed in EXAMPLES later can also be used in the present invention. A structure represented by the formula (1-1) below is introduced into the polymer terminal by the reaction between the compound of formula (1) and the copolymer to be modified.

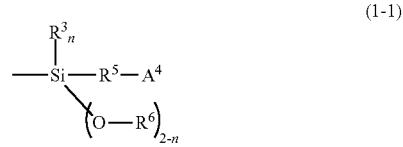

In formula (1-1), $R^6$ represents a hydrogen atom or a hydrocarbyl group, and when two or more $R^6$ groups are present, they may be the same or different. Examples of the hydrocarbyl group for $R^6$ include those listed above for the hydrocarbyl group for $R^3$ and $R^4$ in formula (1). $A^4$, $R^3$, $R^5$ and n are as defined for $A^1$, $R^3$, $R^5$ and n, respectively, in formula (1).

The terminal modification reaction may be performed as a solution reaction, for example. The solution reaction may be carried out using the solution containing unreacted monomers obtained after completion of the polymerization reaction in the polymerization step, or a solution prepared by isolating the copolymer from the above solution and dissolving it in an appropriate solvent such as cyclohexane. The terminal modification reaction may be carried out either batchwise or continuously. Here, the compound (B2) may be added in any manner, such as at one time, in portions, or continuously.

The amount of the compound (B2) used in the terminal modification reaction may be selected appropriately according to the type of compound used in the reaction. The amount of the compound (B2) is preferably 0.1 mole equivalents or more, more preferably 0.3 mole equivalents or more relative to the metal atom of the polymerization initiator involved in the polymerization reaction. With 0.1 mole equivalents or more of the compound (B2), the modification reaction can proceed sufficiently, and the dispersibility of silica can be suitably improved.

The temperature of the terminal modification reaction is usually the same as the temperature of the polymerization reaction, and is preferably −20° C. to 150° C., more preferably 0° C. to 120° C., particularly preferably 20° C. to 100° C. When the temperature of the modification reaction is low, the viscosity of the modified copolymer tends to increase, while when the temperature of the modification reaction is high, the polymerization active terminal can be easily deactivated. The duration of the modification reaction is preferably one minute to five hours, more preferably two minutes to one hour.

(Termination of Reaction)

The anionic polymerization can be terminated by addition of a reaction terminator usually used in this field. Examples of the reaction terminator include polar solvents containing active protons such as acetic acid, and methanol, ethanol, isopropanol, and other alcohols, and mixtures of the foregoing. Other examples include mixtures of the foregoing polar solvents and non-polar solvents such as hexane or cyclohexane. Usually, the amount of the reaction terminator to be added is sufficient when it is about equal to or twice the molar amount of the initiator for anionic polymerization.

<Coupling>

In the method for producing the copolymer, a coupling agent may be added to the hydrocarbon solution of the copolymer at any time from the initiation of the polymerization of monomers until the polymer is recovered as described later. The coupling agent may be a compound represented by the following formula (2-1):

wherein R¹ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agent of formula (2-1) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In order to enhance the processability of the polymer, the amount of the coupling agent to be added is preferably 0.03 mol or more, more preferably 0.05 mol or more, per mol of the alkali metal derived from an alkali metal catalyst. In order to enhance fuel economy, the amount is preferably 0.4 mol or less, more preferably 0.3 mol or less.

<Hydrogenation Method>

In the method for producing the hydrogenated copolymer, the copolymer described above is hydrogenated to obtain a hydrogenated copolymer having a degree of hydrogenation of 30 to 100 mol %. The hydrogenation of the copolymer advantageously improves heat resistance. When the degree of hydrogenation is lower, the effects of improving rubber tensile strength and abrasion resistance are not sufficiently achieved.

The hydrogenation may be carried out by any method under any reaction condition, including known methods and known conditions. Usually, the hydrogenation is carried out at 20° C. to 150° C. under 0.1 to 10 MPa hydrogen pressure in the presence of a hydrogenation catalyst. The degree of hydrogenation can be set as desired by changing, for example, the amount of the hydrogenation catalyst, the hydrogen pressure during the hydrogenation reaction, or the duration of the reaction. The hydrogenation catalyst used may be usually a compound containing any of the metals of groups 4 to 11 of the periodic table. For example, compounds containing any of the atoms: Ti, V, Co, Ni, Zr, Ru, Rh, Pd, Hf, Re, and Pt can be used as hydrogenation catalysts. More specific examples of the hydrogenation catalyst include metallocene compounds containing Ti, Zr, Hf, Co, Ni, Pd, Pt, Ru, Rh, Re, or other metals; supported heterogeneous catalysts in which a metal such as Pd, Ni, Pt, Rh, or Ru is supported on a carrier such as carbon, silica, alumina, or diatomaceous earth; homogeneous Ziegler catalysts in which an organic salt or acetylacetone salt of a metal element such as Ni or Co is combined with a reducing agent such as an organoaluminum; organometallic compounds or complexes of Ru, Rh, or other metals; and fullerenes and carbon nanotubes in which hydrogen is stored.

Among the above exemplary compounds, metallocene compounds containing Ti, Zr, Hf, Co, or Ni are preferred because they allow the hydrogenation reaction to be carried out in a homogeneous system in an inert organic solvent. More preferred are metallocene compounds containing Ti, Zr, or Hf. In particular, hydrogenation catalysts obtained by reaction of titanocene compounds and alkyllithiums are preferred because such catalysts are inexpensive and industrially very useful. Specific examples include hydrogenation catalysts described in, for example, JP H1-275605 A, JP H5-271326 A, JP H5-271325 A, JP H5-222115 A, JP H11-292924 A, JP 2000-37632 A, JP S59-133203 A, JP S63-5401 A, JP S62-218403 A, JP H7-90017 A, JP S43-19960 B, and JP S47-40473 B, the disclosures of which are incorporated by reference herein. These hydrogenation catalysts may be used alone, or two or more of these may be used in combination.

The amount of the hydrogenated copolymer based on 100% by mass of the rubber component is 10% by mass or more. Also, the upper limit of the amount is 80% by mass or less. In view of adhesion to adjacent components, it is preferably 60% by mass or less, more preferably 40% by mass or less.

The rubber composition in the present invention contains at least one general purpose rubber selected from the group consisting of natural rubber (NR), polyisoprene rubber (IR), styrene-butadiene rubber (SBR), and polybutadiene rubber (BR). Hydrogenated copolymers, which have a smaller number of reactive sites for crosslinking than common general purpose rubbers, show inferior adhesion to adjacent components. According to the present invention, by incorporating the above-described general purpose rubber with the hydrogenated copolymer while adjusting the proportion of the hydrogenated copolymer, good abrasion resistance and other properties which are not attainable by common general purpose rubbers can be obtained while ensuring adhesion to adjacent components and Mooney viscosity, with which hydrogenated copolymers have problems.

In order to suitably achieve the effects of the present invention, the general purpose rubber is preferably SBR or BR, more preferably a combination of SBR and BR.

In order to suitably achieve the effects of the present invention, the SBR preferably has a weight average molecular weight (Mw) of 50,000 or more, more preferably 400,000 or more, but preferably 2,000,000 or less, more preferably 1,000,000 or less, still more preferably 700,000 or less.

For the same reason, the SBR preferably has a styrene content of 5% by mass or more, more preferably 15% by mass or more, still more preferably 25% by mass or more, but preferably 50% by mass or less, more preferably 40% by mass or less, still more preferably 35% by mass or less.

The amount of the general purpose rubber based on 100% by mass of the rubber component is preferably 40% by mass or more, more preferably 60% by mass or more, in view of cured adhesion strength and Mooney viscosity. Also, the upper limit of the amount is preferably 90% by mass or less in view of abrasion resistance.

In order to suitably achieve the effects of the present invention, the amount of SBR based on 100% by mass of the rubber component is preferably 10% by mass or more, more preferably 30% by mass or more, but preferably 80% by mass or less, more preferably 40% by mass or less.

For the same reason, the amount of BR based on 100% by mass of the rubber component is preferably 5% by mass or more, more preferably 15% by mass or more, but preferably 40% by mass or less, more preferably 30% by mass or less.

The rubber composition in the present invention preferably contains silica. Non-limiting examples of the silica include dry silica (anhydrous silica) and wet silica (hydrous silica). Wet silica is preferred because it contains a large number of silanol groups.

In view of abrasion resistance, the silica preferably has a nitrogen adsorption specific surface area ($N_2SA$) of 45 $m^2/g$ or more, more preferably 55 $m^2/g$ or more, still more preferably 60 $m^2/g$ or more, particularly preferably 100 $m^2/g$ or more, most preferably 150 $m^2/g$ or more. In view of fuel economy, the $N_2SA$ of the silica is also preferably 350 $m^2/g$ or less, more preferably 300 $m^2/g$ or less, still more preferably 270 $m^2/g$ or less, particularly preferably 220 $m^2/g$ or less.

The nitrogen adsorption specific surface area of the silica is determined by the BET method in accordance with ASTM D3037-81.

When the rubber composition in the present invention contains silica, in view of fuel economy and abrasion resistance, the amount of silica per 100 parts by mass of the rubber component is preferably 1 part by mass or more, more preferably 10 parts by mass or more, still more preferably 30 parts by mass or more, particularly preferably 45 parts by mass or more, but preferably 200 parts by mass or less, more preferably 150 parts by mass or less, still more preferably 120 parts by mass or less, particularly preferably 100 parts by mass or less.

The rubber composition in the present invention preferably contains another filler in addition to silica. The term "filler" herein refers to a material that is incorporated into a rubber composition to reinforce the rubber. Examples include white fillers such as calcium carbonate, mica (e.g. sericite), aluminum hydroxide, magnesium oxide, magnesium hydroxide, clay, talc, alumina, and titanium oxide, and carbon black. Two or more of these fillers may be used in combination. For reinforcement, carbon black is particularly preferably incorporated.

When the rubber composition in the present invention contains another filler in addition to silica, the amount of silica based on 100% by mass of the total filler is preferably 80% by mass or more, more preferably 90% by mass or more.

When the rubber composition in the present invention contains carbon black, examples of the carbon black include furnace blacks (furnace carbon blacks) such as SAF, ISAF, HAF, MAF, FEF, SRF, GPF, APF, FF, CF, SCF, and ECF; acetylene blacks (acetylene carbon blacks); thermal blacks (thermal carbon blacks) such as FT and MT; channel blacks (channel carbon blacks) such as EPC, MPC, and CC; and graphite. These may be used alone, or two or more of these may be used in combination.

The carbon black usually has a nitrogen adsorption specific surface area ($N_2SA$) of 5 to 200 $m^2/g$. In view of abrasion resistance, the lower limit of the $N_2SA$ is preferably 50 $m^2/g$, more preferably 80 $m^2/g$. In view of fuel economy, the upper limit is preferably 150 $m^2/g$, more preferably 120 $m^2/g$. The carbon black usually has a dibutyl phthalate (DBP) absorption of 5 to 300 mL/100 g. Preferably, the lower limit of the DBP is 80 mL/100 g, while the upper limit is 180 mL/100 g.

The nitrogen adsorption specific surface area is measured in accordance with ASTM D4820-93. The DBP absorption is measured in accordance with ASTM D2414-93.

When the rubber composition in the present invention contains carbon black, in view of abrasion resistance, the amount of carbon black is preferably 1 part by mass or more, more preferably 3 parts by mass or more per 100 parts by mass of the rubber component. In view of fuel economy, the amount of carbon black is also preferably 60 parts by mass or less, more preferably 30 parts by mass or less, still more preferably 15 parts by mass or less per 100 parts by mass of the rubber component.

The rubber composition in the present invention preferably contains a silane coupling agent together with silica.

The silane coupling agent may be a conventionally known one, and examples include: sulfide silane coupling agents such as bis(3-triethoxysilylpropyl)tetrasulfide, bis(2-triethoxysilylethyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane. These silane coupling agents may be used alone, or two or more of these may be used in combination. In view of the coupling effect produced by the silane coupling agent, processability, and cost, sulfide silane coupling agents are preferred among these, with bis(3-triethoxysilylpropyl)tetrasulfide or bis(3-triethoxysilylpropyl)disulfide being more preferred.

In view of fuel economy and abrasion resistance, the amount of the silane coupling agent is preferably 3 parts by mass or more, more preferably 5 parts by mass or more per 100 parts by mass of silica. In view of Mooney viscosity, the amount of the silane coupling agent is also preferably 15 parts by mass or less, more preferably 10 parts by mass or less per 100 parts by mass of silica.

The rubber composition in the present invention may contain, in addition to the above-described components, compounding agents conventionally used in the rubber industry. Examples include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; processing aids such as extender oils (oils) and lubricants; and antioxidants.

Examples of the extender oil (oil) include aromatic mineral oils (viscosity gravity constant (V.G.C.): 0.900 to 1.049), naphthenic mineral oils (V.G.C.: 0.850 to 0.899), and paraffinic mineral oils (V.G.C.: 0.790 to 0.849). The polycyclic aromatic content of the extender oil is preferably less than 3% by mass, more preferably less than 1% by mass. The polycyclic aromatic content is measured in accordance with the Institute of Petroleum (IP, U.K.) 346/92 method. The aromatic content (CA) of the extender oil is preferably 20% by mass or more. Two or more of these extender oils may be used in combination.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. In order to more suitably achieve the effects of the present invention, sulfenamide vulcanization accelerators are preferred among these, with N-cyclohexyl-2-benzothiazolesulfenamide being more preferred. Moreover, their combinations with guanidine vulcanization accelerators are also preferred. The amount of the vulcanization accelerator per 100 parts by mass of the rubber component is preferably 0.1 to 5 parts by mass, more preferably 0.2 to 4 parts by mass.

The vulcanizing agent is not particularly limited and may suitably be sulfur. The amount of sulfur per 100 parts by mass of the rubber component is preferably 0.5 to 5 parts by mass, more preferably 1 to 3 parts by mass. In this case, the effects of the present invention can be more suitably achieved.

The rubber composition in the present invention can be prepared by usual methods. Specifically, for example, the components described above are kneaded using a Banbury mixer, a kneader, an open roll mill, or other devices, followed by vulcanization to prepare a rubber composition.

The rubber composition in the present invention can be used in various tire components, such as treads, sidewalls, carcasses, belts, beads, clinches, or chafers, and suitably used in treads or sidewalls, among others. In the case of a two-layer tread, it consists of an outer surface layer (cap tread) and an inner surface layer (base tread).

A multi-layer tread may be produced by assembling sheet-shaped rubber compositions into a predetermined shape, or by feeding rubber compositions into two or more extruders and forming them into a two- or more-layered product at the head outlet of the extruders.

The pneumatic tire of the present invention can be formed from the rubber composition by conventional methods. Specifically, an unvulcanized rubber composition containing a rubber component including a hydrogenated copolymer and a general purpose rubber, and optionally various compounding agents described above is extruded and processed into the shape of a tire component such as a tread or a sidewall and assembled with other tire components in a conventional manner on a tire building machine to build an unvulcanized tire. The unvulcanized tire is heat pressed in a vulcanizer to produce a pneumatic tire of the present invention.

The pneumatic tire of the present invention is suitable for, for example, passenger vehicles, trucks and buses, two-wheeled vehicles, and racing vehicles, especially for passenger vehicles.

EXAMPLES

The present invention is specifically described with reference to, but not limited to, the examples below.

The chemicals used in the synthesis or polymerization are listed below. The chemicals were purified as needed by conventional techniques.

n-Hexane: product of Kanto Chemical Co., Inc.
Styrene: product of Kanto Chemical Co., Inc.
Butadiene: 1,3-butadiene available from Tokyo Chemical Industry Co., Ltd.
THF: tetrahydrofuran available from Kanto Chemical Co., Inc.
TMEDA: N,N,N',N'-tetramethylethylenediamine available from Kanto Chemical Co., Inc.
n-Butyllithium solution: 1.6 M solution of n-butyllithium in hexane available from Kanto Chemical Co., Inc.
Ethanol: product of Kanto Chemical Co., Inc. 2,6-Di-tert-butyl-p-cresol: Nocrac 200 available from Ouchi Shinko Chemical Industrial Co., Ltd.
Amine modifier: N,N-bis(trimethylsilyl)-aminopropylmethyldiethoxysilane The methods for evaluating the prepared polymers are collectively described below.

(Measurement of Degree of Hydrogenation of Conjugated Diene Portion of Polymer)

A 15% by mass solution of each polymer in carbon tetrachloride was prepared to measure a $^1$H-NMR spectrum at 100 MHz. The degree of hydrogenation was calculated from the rate of decrease in the intensity of the $^1$H-NMR spectrum corresponding to unsaturated bonds.

(Structural Identification of Polymer)

The structural identification (styrene content, vinyl group content, butadiene content (conjugated diene content)) of each polymer was performed using a JNM-ECA series apparatus available from JEOL Ltd. For the measurement, 0.1 g of each unhydrogenated polymer was dissolved in 15 mL of toluene, and the solution was slowly poured into 30 mL of methanol for reprecipitation. The precipitate was dried under reduced pressure prior to the structural identification.

(Measurement of Weight Average Molecular Weight (Mw) and Number Average Molecular Weight (Mn))

The weight average molecular weight (Mw) and number average molecular weight (Mn) of each polymer were determined by gel permeation chromatography (GPC) (GPC-8000 series available from Tosoh Corporation, detector: differential refractometer, column: TSKGEL SUPER-MULTIPORE HZ-M available from Tosoh Corporation) calibrated with polystyrene standards. In the case of polymers containing a modifying group, the Mw and Mn were measured on the corresponding unmodified polymers. This is because the Mw and Mn of polymers containing a modifying group cannot be accurately determined due to the interaction between the modifying group and the silica gel in the column.

(Measurement of Glass Transition Temperature (Tg))

The glass transition temperature (Tg) was defined as the glass transition onset temperature measured using a differential scanning calorimeter (Q200 available from TA Instruments, Japan) at a temperature increase rate of 10° C./min in accordance with JIS K 7121.

(Co)polymer Production Examples

Synthesis Example 1 (Synthesis of SBR)

A sufficiently nitrogen-purged heat-resistant reaction vessel was charged with 2,000 mL of n-hexane, 60 g of styrene, 140 g of butadiene, 2.5 g of THF, and 0.45 mmol of n-butyllithium, followed by stirring at 50° C. for five hours to cause a polymerization reaction. After the reaction was terminated by addition of ethanol, 1 g of 2,6-di-tert-butyl-p-cresol was added to the reaction solution. The resulting solution was purified by reprecipitation to obtain a polymer (SBR).

Synthesis Example 2 (Synthesis of Hydrogenated Copolymer 1)

Hydrogenated copolymer 1 was produced as in Synthesis Example 1, except that the obtained polymer was hydrogenated. Specifically, after the polymerization conversion reaction in Synthesis Example 1, the polymerization reaction was not terminated by addition of ethanol. Instead, the reaction solution was then stirred for 20 minutes while supplying hydrogen gas at a pressure of 0.4 MPa gauge to react the unreacted polymer terminal lithium with hydrogen into lithium hydride. Hydrogenation was carried out using a titanocene dichloride-based catalyst at a hydrogen gas supply pressure of 0.7 MPa gauge and a reaction temperature of 90° C. Once the cumulative amount of absorbed hydrogen reached the amount corresponding to the target degree of hydrogenation, the reaction temperature was brought to room temperature and the hydrogen pressure was returned to an ordinary pressure. Then, the reaction solution was drawn from the reaction vessel and introduced into water with stirring. The solvent was removed by steam stripping to obtain hydrogenated copolymer 1 (hydrogenated SBR).

Synthesis Example 3 (Synthesis of Hydrogenated Copolymer 2)

Hydrogenated copolymer 2 (hydrogenated SBR) was produced as in Synthesis Example 2, except that the cumulative amount of absorbed hydrogen was adjusted so as to correspond to the target degree of hydrogenation.

Synthesis Example 4 (Synthesis of Hydrogenated Copolymer 3)

Hydrogenated copolymer 3 (hydrogenated SBR) was produced as in Synthesis Example 2, except that the cumulative amount of absorbed hydrogen was adjusted so as to correspond to the target degree of hydrogenation.

Synthesis Example 5 (Synthesis of Hydrogenated Copolymer 4)

A sufficiently nitrogen-purged heat-resistant reaction vessel was charged with 2,000 mL of n-hexane, 60 g of styrene, 140 g of 1,3-butadiene, 2.5 g of THF, and 0.45 mmol of n-butyllithium, followed by stirring at 50° C. for five hours to cause a polymerization reaction. Then, 0.15 mol of the amine modifier was added and stirred at 0° C. for one hour. The subsequent procedure was as described in Synthesis Example 2, except for the adjustment of the cumulative amount of absorbed hydrogen. In this manner, hydrogenated copolymer 4 (hydrogenated modified SBR) was produced.

Table 1 below shows the analytical data of the SBR and hydrogenated copolymers 1 to 4 synthesized as above and of hydrogenated copolymers 5 and 6, which will be described later.

Hydrogenated copolymers 1 to 4: hydrogenated copolymers synthesized as above

Hydrogenated copolymer 5: DYNARON® 2324P available from JSR Corporation

Hydrogenated copolymer 6: Tuftec® P1083 available from Asahi Kasei Corporation

Carbon black: Diablack N339 ($N_2SA$: 96 $m^2/g$, DBP absorption: 124 mL/100 g) available from Mitsubishi Chemical Corporation Oil: X-140 available from JX Nippon Oil & Energy Corporation Silica: ULTRASIL VN3 ($N_2SA$: 180 $m^2/g$) available from Evonik Silane coupling agent: Si69 (bis(3-triethoxy-silylpropyl) tetrasulfide) available from Evonik Antioxidant: Antigene 3C available from Sumitomo Chemical Co., Ltd.

Stearic acid: stearic acid beads "TSUBAKI" available from NOF Corporation

Zinc oxide: zinc oxide #1 available from Mitsui Mining & Smelting Co., Ltd.

Wax: Sunnoc N available from Ouchi Shinko Chemical Industrial Co., Ltd.

Sulfur: sulfur powder available from Tsurumi Chemical Industry Co., Ltd.

Vulcanization accelerator (1): Soxinol CZ (N-cyclohexyl-2-benzothiazolylsulfenamide) available from Sumitomo Chemical Co., Ltd.

Vulcanization accelerator (2): Soxinol D (1,3-diphenylguanidine) available from Sumitomo Chemical Co., Ltd.

Examples and Comparative Examples

According to each of the formulations shown in Table 2, the materials other than the sulfur and vulcanization accelerators were kneaded for five minutes at 150° C. in a 1.7 L Banbury mixer (available from Kobe Steel, Ltd.) to give a kneaded mixture. Next, the sulfur and vulcanization accelerators were added to the kneaded mixture, followed by kneading for five minutes at 80° C. in an open roll mill to obtain an unvulcanized rubber composition. The unvulcanized rubber composition was press-vulcanized for 20 minutes at 170° C. in a 0.5 mm-thick die to obtain a vulcanized rubber composition.

Separately, the unvulcanized rubber composition prepared as above was formed into the shape of a tread or a sidewall and assembled with other tire components, followed by vulcanization at 170° C. for 20 minutes to obtain a test tire.

TABLE 1

|  | SBR | Hydrogenated copolymer | | | | | |
|---|---|---|---|---|---|---|---|
|  |  | 1 | 2 | 3 | 4 | 5 | 6 |
| Degree of hydrogenation (mol %) | 0 | 61 | 77 | 94 | 96 | 99 | 80 |
| Styrene content (% by mass) | 29 | 30 | 29 | 30 | 30 | 16 | 20 |
| Weight average molecular weight (Mw) | 460,000 | 450,000 | 440,000 | 460,000 | 450,000 | 150,000 | 90,000 |
| Mw/Mn | 1.2 | 1.2 | 1.2 | 1.1 | 1.2 | 1.2 | 1.3 |
| Glass transition temperature (Tg) (° C.) | −30 | −29 | −30 | −30 | −31 | −50 | −65 |

The chemicals used in examples and comparative examples are listed below.
SBR: SBR synthesized as above
BR: BR150B available from Ube Industries, Ltd.

<Evaluation Items and Testing Methods>

The unvulcanized rubber compositions, vulcanized rubber compositions, and test tires prepared as above were evaluated for the following items. Table 2 shows the results.

(Abrasion Resistance)

The volume loss of each vulcanized rubber composition was measured with a laboratory abrasion and skid tester (LAT tester) at a load of 50 N, a speed of 20 km/h, and a slip angle of 5 degrees. The volume losses are expressed as an index, with Comparative Example 1 set equal to 100. A higher index indicates better abrasion resistance.

(Fuel Economy)

The tan δ of each vulcanized rubber composition was measured at a dynamic strain amplitude of 1%, a frequency of 10 Hz, and a temperature of 50° C. using a spectrometer available from Ueshima Seisakusho Co., Ltd. The reciprocals of the tan δ values are expressed as an index, with Comparative Example 1 set equal to 100. A higher index indicates a smaller rolling resistance and better fuel economy.

(Cured Adhesion Strength)

A peel test was performed in accordance with JIS K 6256 "Rubber, vulcanized or thermoplastic—Determination of adhesion". A 2 mm-thick rubber sheet 1 formed of each vulcanized rubber composition, a 2 mm-thick rubber sheet 2 (composition: NR/BR/SBR=40/30/30 (mass ratio)), and a reinforcing canvas fabric were stacked in this order, and then pressurized and heated at 170° C. for 12 minutes to prepare a peel test specimen. The specimen (size: 25 mm) was subjected to a peel test at a room temperature of 23° C. to measure the adhesion strength between the rubber sheet 1 and the rubber sheet 2. The results are expressed as an index, with Comparative Example 1 set equal to 100. A higher index indicates a greater adhesion strength. An index of 85 or higher means good adhesion strength.

(Mooney Viscosity)

The Mooney viscosity of each unvulcanized rubber composition was measured at 130° C. by a method for measuring Mooney viscosity in accordance with JIS K 6300. The reciprocals of the Mooney viscosities are expressed as an index, with Comparative Example 1 set equal to 100. A higher index indicates a smaller Mooney viscosity and better processability. An index of 85 or higher means good Mooney viscosity.

TABLE 2

| | | Comparative Example | | | | | Example | | | |
|---|---|---|---|---|---|---|---|---|---|---|
| | | 1 | 2 | 3 | 4 | 5 | 1 | 2 | 3 | 4 |
| Formulation (parts by mass) | SBR | 100 | — | — | — | — | 20 | 20 | 20 | 20 |
| | BR | — | — | — | — | — | 20 | 20 | 20 | 20 |
| | Hydrogenated copolymer 1 | — | 100 | — | — | — | 60 | — | — | — |
| | Hydrogenated copolymer 2 | — | — | 100 | — | — | — | 60 | — | — |
| | Hydrogenated copolymer 3 | — | — | — | 100 | — | — | — | 60 | — |
| | Hydrogenated copolymer 4 | — | — | — | — | 100 | — | — | — | 60 |
| | Hydrogenated copolymer 5 | — | — | — | — | — | — | — | — | — |
| | Hydrogenated copolymer 6 | — | — | — | — | — | — | — | — | — |
| | Carbon black | 5 | 5 | 5 | 5 | 5 | 5 | 5 | 5 | 5 |
| | Oil | 25 | 25 | 25 | 25 | 25 | 25 | 25 | 25 | 25 |
| | Silica | 75 | 75 | 75 | 75 | 75 | 75 | 75 | 75 | 75 |
| | Silane coupling agent | 6 | 6 | 6 | 6 | 6 | 6 | 6 | 6 | 6 |
| | Antioxidant | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 |
| | Sulfur | 2 | 2 | 2 | 2 | 2 | 2 | 2 | 2 | 2 |
| | Vulcanization accelerator (1) | 1.8 | 1.8 | 1.8 | 1.8 | 1.8 | 1.8 | 1.8 | 1.8 | 1.8 |
| | Vulcanization accelerator (2) | 1.2 | 1.2 | 1.2 | 1.2 | 1.2 | 1.2 | 1.2 | 1.2 | 1.2 |
| Evaluation | Abrasion resistance index | 100 | 111 | 135 | 190 | 193 | 108 | 125 | 142 | 147 |
| | Fuel economy index | 100 | 101 | 99 | 103 | 108 | 103 | 101 | 102 | 104 |
| | Cured adhesion strength index | 100 | 65 | 52 | 45 | 30 | 92 | 91 | 90 | 89 |
| | Mooney viscosity index | 100 | 82 | 73 | 65 | 62 | 93 | 90 | 89 | 89 |

| | | Example | | | | | | | |
|---|---|---|---|---|---|---|---|---|---|
| | | 5 | 6 | 7 | 8 | 9 | 10 | 11 | 12 |
| Formulation (parts by mass) | SBR | 20 | 20 | 60 | 60 | 60 | 60 | 60 | 60 |
| | BR | 20 | 20 | 20 | 20 | 20 | 20 | 20 | 20 |
| | Hydrogenated copolymer 1 | — | — | 20 | — | — | — | — | — |
| | Hydrogenated copolymer 2 | — | — | — | 20 | — | — | — | — |
| | Hydrogenated copolymer 3 | — | — | — | — | 20 | — | — | — |
| | Hydrogenated copolymer 4 | — | — | — | — | — | 20 | — | — |
| | Hydrogenated copolymer 5 | 60 | — | — | — | — | — | 20 | — |
| | Hydrogenated copolymer 6 | — | 60 | — | — | — | — | — | 20 |
| | Carbon black | 5 | 5 | 5 | 5 | 5 | 5 | 5 | 5 |
| | Oil | 25 | 25 | 25 | 25 | 25 | 25 | 25 | 25 |
| | Silica | 75 | 75 | 75 | 75 | 75 | 75 | 75 | 75 |
| | Silane coupling agent | 6 | 6 | 6 | 6 | 6 | 6 | 6 | 6 |
| | Antioxidant | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 |
| | Wax | 1 | 1 | 1 | 1 | 1 | 1 | 1 | 1 |
| | Sulfur | 2 | 2 | 2 | 2 | 2 | 2 | 2 | 2 |
| | Vulcanization accelerator (1) | 1.8 | 1.8 | 1.8 | 1.8 | 1.8 | 1.8 | 1.8 | 1.8 |
| | Vulcanization accelerator (2) | 1.2 | 1.2 | 1.2 | 1.2 | 1.2 | 1.2 | 1.2 | 1.2 |

TABLE 2-continued

| Evaluation | Abrasion resistance index | 126 | 122 | 104 | 112 | 131 | 127 | 121 | 111 |
|---|---|---|---|---|---|---|---|---|---|
| | Fuel economy index | 91 | 85 | 104 | 104 | 101 | 103 | 93 | 91 |
| | Cured adhesion strength index | 91 | 90 | 95 | 98 | 97 | 96 | 94 | 95 |
| | Mooney viscosity index | 88 | 85 | 100 | 98 | 99 | 97 | 99 | 98 |

Table 2 shows that in Examples 1 to 12, fuel economy and abrasion resistance were improved while ensuring good adhesion strength and good Mooney viscosity, as compared to Comparative Example 1. It is thus demonstrated that a balanced improvement in fuel economy, abrasion resistance, and processability was achieved by the use of a rubber composition that contained both a hydrogenated copolymer (hydrogenated copolymer 1 to 6 shown in Table 2) having a degree of hydrogenation, a weight average molecular weight, and a styrene content falling within respective predetermined ranges, and at least one general purpose rubber selected from the group consisting of NR, IR, SBR, and BR (SBR or BR shown in Table 2).

The invention claimed is:

1. A pneumatic tire, formed from a rubber composition, the rubber composition comprising a rubber component including a hydrogenated copolymer and a general purpose rubber,
the hydrogenated copolymer containing a structural unit derived from an aromatic vinyl compound and a structural unit derived from a conjugated diene compound, the hydrogenated copolymer having a degree of hydrogenation of the conjugated diene portion of 30 to 100 mol %, a weight average molecular weight of 50,000 to 2,000,000, and a styrene content of 5% to 50% by mass,
the general purpose rubber being at least one selected from the group consisting of natural rubber, polyisoprene rubber, styrene-butadiene rubber, and polybutadiene rubber, and
the rubber component including, based on 100% by mass thereof, 10% to 60% by mass of the hydrogenated copolymer.

2. The pneumatic tire according to claim 1, wherein the hydrogenated copolymer has a degree of hydrogenation of 60 to 100 mol %.

3. The pneumatic tire according to claim 2, wherein the hydrogenated copolymer has a degree of hydrogenation of 90 to 100 mol %.

4. The pneumatic tire according to claim 1, wherein the hydrogenated copolymer is a hydrogenated styrene-butadiene copolymer.

5. The pneumatic tire according to claim 4, wherein the hydrogenated copolymer is a hydrogenated modified styrene-butadiene copolymer.

6. The pneumatic tire according to claim 1, wherein the hydrogenated copolymer has a weight average molecular weight of 200,000 to 2,000,000.

7. The pneumatic tire according to claim 1, wherein the rubber component includes, based on 100% by mass thereof, 10% to 40% by mass of the hydrogenated copolymer.

8. The pneumatic tire according to claim 1, wherein the hydrogenated copolymer has a styrene content of 20% to 50% by mass.

9. The pneumatic tire according to claim 1, wherein the rubber composition comprises silica in an amount of 1 to 200 parts by mass per 100 parts by mass of the rubber component.

10. The pneumatic tire according to claim 1, wherein the rubber composition comprises carbon black in an amount of 1 part by mass or more per 100 parts by mass of the rubber component.

11. The pneumatic tire according to claim 1, comprising a tread formed from the rubber composition.

12. The pneumatic tire according to claim 1, comprising a sidewall formed from the rubber composition.

* * * * *